Jan. 3, 1933.     W. M. BENZICK ET AL     1,893,390
BAIT
Filed Aug. 21, 1931

William M. Benzick,
Oscar W. Eck,
INVENTOR

BY Victor J. Evans and Co.
ATTORNEY

Patented Jan. 3, 1933

1,893,390

UNITED STATES PATENT OFFICE

WILLIAM M. BENZICK AND OSCAR W. ECK, OF ST. PAUL, MINNESOTA

BAIT

Application filed August 21, 1931. Serial No. 558,550.

This invention relates to artificial bait and has for the primary object, the provision of a device of the above stated character especially adapted for casting or trolling and will have the attractiveness and merits of a spinner and spoon combined so as to effectively lure fish thereto when moving through the water and which is so constructed that the spinner is free to rotate without the danger of twisting or winding the line and the spoon may be easily detached when desired to employ any other type of artificial bait with the spinner.

With this and other objects in view, this invention consists in certain novel features of construction, combination and arrangement of parts to be hereinafter more fully described and claimed.

For a complete understanding of our invention, reference is to be had to the following description and accompanying drawing, in which Figure 1 is a plan view illustrating an artificial bait constructed in accordance with our invention.

Figure 1:
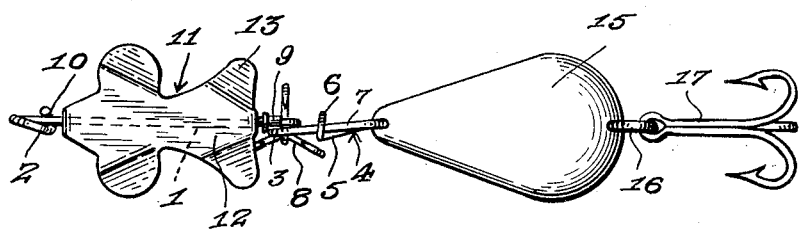
Figure 2:
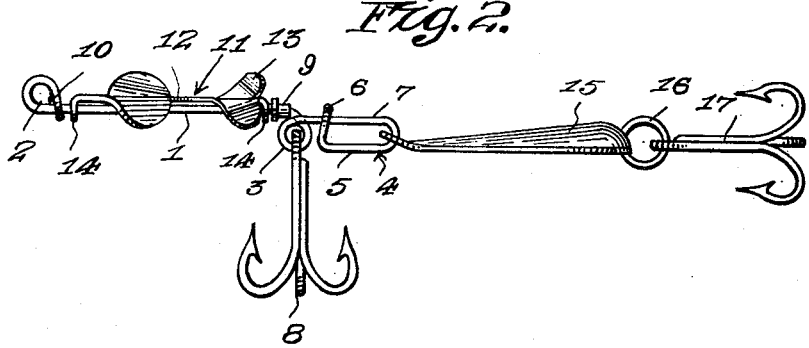
Figure 2 is a side elevation illustrating the same.
Figure 3:
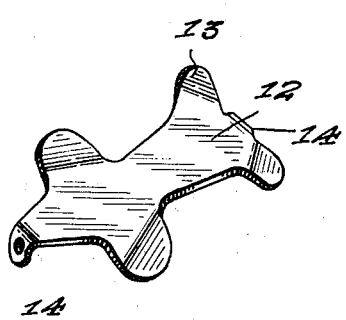
Figure 3 is a perspective view illustrating the spinner.

Referring in detail to the drawing, the numeral 1 indicates a combined supporting and attaching rod having one end bent to form an eye 2 for the purpose of connecting a fishing line thereto. The rod adjacent its opposite end is bent angularly to form an eye 3 and a fastener 4. The eye 3 is of the open type and the fastener consists of a resilient arm 5 provided with a hook shaped portion 6 arranged angularly thereto and adapted to engage over the major portion 7 of the fastener so that artificial bait of various types may be easily applied to the rod and with hooks 8 applied to the eye 3. The fastener 4 and the eye 3 are disposed in a plane below the rod 1 when the device is in use.

A bearing collar 9 is mounted on the rod 1 adjacent the eye 3 while the end of the material forming the eye 2 is bent about the rod to provide a bearing 10. A spinner 11 is journalled upon the rod between the bearings 9 and 10 and includes an elongated plate 12 having formed thereon pairs of oppositely disposed ears 13. The ears 13 of each pair are bent in opposite directions to cause rotation of the plate 12 when the device is drawn through the water. The ends of the plate 12 are provided with angularly disposed apertured ears 14 to receive the rod 1 for rotatably connecting the plate to said rod. The plate 12 and ears 13 may be painted or otherwise coated in different colors for the purpose of attracting attention.

A spoon 15 is mounted on the fastener 4 and carries a ring 16 to receive hooks 17.

On the device being drawn through the water either by trolling or casting, the spinner 11 rotates about the rod 1 while the spoon follows the spinner and may rock from one side to the other so as to cooperate with the spinner in attracting fish thereto. Should a fish bite or strike at the device adjacent the spinner the hooks 8 will then engage and catch the fish. Should the fish bite or strike at the spoon 15, they will be caught by the hooks 17. A device constructed in accordance with the foregoing will travel through the water in a substantially straight course and due to the spinner 11 being rotatably mounted on the rod 1 said spinner will be prevented from winding or twisting the line. Should it be desired to employ some other type of artificial bait in connection with the spinner instead of the spoon 15, the latter may be easily removed and the other bait applied to the fastener.

While we have shown and described the preferred embodiment of our invention, it will be understood that minor changes in construction, combination and arrangement of parts may be made without departing from the spirit and scope of our invention, as claimed.

Having thus described our invention, what we claim is:

An artificial bait comprising a rod bent and looped about itself at one end thereof to form an eye to be attached to a fishing line and providing a bearing on the rod, said rod adjacent its opposite end looped to form a second eye for receiving a hook and providing a second bearing on said rod, a spinner journalled on the rod between said bearings, said rod after forming the second eye being bent upon itself to provide an elongated loop portion having the free end disposed angularly thereto and bent in hook formation to engage the rod and capable of being disconnected therefrom to permit the application of a spoon to the looped portion of the rod.

In testimony whereof we affix our signatures.

WILLIAM M. BENZICK.
OSCAR W. ECK.